United States Patent [19]

Bailey

[11] 4,157,906
[45] Jun. 12, 1979

[54] METHOD OF DRAWING GLASS OPTICAL WAVEGUIDES

[75] Inventor: Alan C. Bailey, Horseheads, N.Y.

[73] Assignee: Corning Glass Works, Corning, N.Y.

[21] Appl. No.: 879,154

[22] Filed: Feb. 21, 1978

[51] Int. Cl.² .............................................. C03B 37/00
[52] U.S. Cl. .................................... 65/3 A; 65/30 R; 65/DIG. 7; 427/167
[58] Field of Search .................... 65/3 A, 13, DIG. 7, 65/30 R; 427/167

[56] References Cited

U.S. PATENT DOCUMENTS

| 3,737,292 | 6/1978 | Keck et al. | 65/13 X |
| 3,737,293 | 6/1978 | Maurer | 65/3 A |

OTHER PUBLICATIONS

"Preparation and Structural Characteristics of High Silica, Graded Index Optical Fibers", O'Connor, et al., American Ceramic Society, vol. 55, No. 5, (1976), pp. 513-579.

"Glass Fibers for Optical Communications", French, et al., Reprint from Annual Review of Materials Science, vol. 5, 1975, pp. 373-394.

Primary Examiner—Robert L. Lindsay, Jr.
Attorney, Agent, or Firm—William J. Simmons, Jr.; Walter S. Zebrowski

[57] ABSTRACT

A method of making glass optical waveguides by the flame hydrolysis technique. Particles of glass soot produced by flame hydrolysis are deposited on the outside surface of a mandrel to form a porous preform. The soot particles closer to the mandrel have a refractive index greater than that of the soot disposed toward the outer surface of the preform. The mandrel is removed and the resultant hollow soot preform is supported in a draw furnace through which a helium-rich gas flows. The preform is heated to a temperature sufficient to cause said soot to consolidate and simultaneously permit an optical waveguide filament to be drawn therefrom.

15 Claims, 3 Drawing Figures

METHOD OF DRAWING GLASS OPTICAL WAVEGUIDES

BACKGROUND OF THE INVENTION

This invention relates to a method of making glass articles by the flame hydrolysis technique and, more particularly, to an improved method of making glass optical waveguide filaments.

It has been known for some time that light can be propagated along a transparent filamentary structure having a refractive index that is greater than that of its surroundings, and clad filaments have heretofore been employed to transmit light over relatively short distances. The numerical aperture (NA) of such a filament which is a measure of the light gathering ability thereof, can be approximated by:

$$NA = \sqrt{2n^2\Delta} \qquad (1)$$

where n is the average of the core and cladding refractive indices, which are designated $n_1$ and $n_2$, respectively, and $\Delta$ is the refractive index difference between the core and cladding and is given by the equation, $\Delta = (n_1^2 - n_2^2)/2n_1^2$. In conventional optical filaments, $\Delta$ is made quite large so that the NA is large, and therefore, the filament is capable of gathering a relatively large amount of light emitted by a source.

Optical waveguides are low loss filaments which have been recently developed as the transmission medium for high capacity optical communication systems. It would be advantageous for optical waveguides to possess high values of NA for the purpose of accepting a large amount of the light radiated from a source connected thereto. Furthermore, optical waveguides are often grouped into cables or bundles to provide redundancy in case of fiber breakage and to transmit a greater amount of the light generated by a source. Attenuation $\gamma$ due to random fiber bends, which can be caused by the cabling process, is given by the equation:

$$\gamma = (c/\Delta)(a^2/\Delta)p \qquad (2)$$

where c and p are parameters related to the geometry of the random bends and the index gradient and a is the core radius. Examination of equation 2 shows that the distortion loss $\gamma$ can be reduced inter alia by increasing $\Delta$, a factor which will also increase the NA as indicated by equation 1.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in filamentary form. Various methods employing the flame hydrolysis technique for forming glass optical waveguide filaments are taught in U.S. Pat. Nos. Re. 28,029, 3,711,262; 3,737,293; 3,823,995 and 3,826,560, the latter two patents being directed to the formation of gradient index waveguides. In accordance with one embodiment of the flame hydrolysis process, referred to herein as the "conventional" process, a plurality of constituents in vapor form are entrained in a gaseous medium in predetermined amounts and thereafter are oxidized in a flame to form soot having a predetermined composition. The soot is applied to the surface of a rotating cylindrical mandrel or starting member. After a first layer of soot is deposited to form the core glass, the composition of the soot is changed to form the cladding glass.

After the soot layers are formed on the mandrel, a rather lengthy process is employed to prepare the draw blank from which an optical waveguide filament can be drawn. The soot preform is removed from the mandrel, and a wire handle is inserted through one end of the resultant hollow preform. While the preform is supported by the handle, it is lowered into a consolidation furnace, wherein the soot sinters and forms a hollow draw blank that is free from particle boundaries. The wire handle is removed, and the walls of the aperture are etched in hydrofluoric acid. The blank is then inspected for seeds and the like, cleaned, and flame-worked on a lathe to form a notch at one end and a tapered region at the other end. The notched end is inserted into a handle, and the blank is again etched, rinsed and dried. The blank is then inserted into a draw furnace where it is heated to a temperature at which the material thereof has a low enough viscosity for drawing and is drawn to reduce the diameter thereof until the inner walls of the hollow member collapse. Continued drawing further reduces the diameter until an optical waveguide filament having the desired dimensions is formed. The number of steps required in the preparation of a draw blank has made this process both complex and costly.

Moreover, the value of $\Delta$ and thus the numerical aperture have been maintained relatively small in optical waveguides for a number of reasons. The cladding of low loss optical waveguides has usually been formed of a high purity glass such as silica, whereas the core has been formed of the same high purity glass to which a sufficient amount of dopant material has been added to increase the refractive index of the core to a value greater than that of the cladding. However, the numerical apertures of such optical waveguides have been relatively low since only a limited amount of dopant could be incorporated into the core thereof due to a mismatch of core-cladding characteristics such as thermal coefficient of expansion and softening point temperature.

Consider, for example, an attempt to fabricate a $GeO_2$ doped-$SiO_2$ optical waveguide by a prior art flame hydrolysis process whereby the mandrel aperture remains in the consolidated glass draw blank. Assume that the optical waveguide should have a numerical aperture of 0.24 based upon such considerations as the type of light source to be employed and the types of bends to which the waveguide will be subjected. Knowing the cladding material to be employed, the cladding refractive index $n_2$ is known. For example, if the cladding material is $SiO_2$ doped with $B_2O_3$, $n_2$ is taken to be about 1.458, the refractive index of silica. Using the well known relationship $NA = (n_1^2 - n_2^2)^{\frac{1}{2}}$ the refractive index $n_1$ of the core is determined to be 1.477. It can be determined that the core glass should consist of about 23 wt.% $GeO_2$ to provide a binary $GeO_2$—$SiO_2$ glass having a refractive index of 1.477. The expansion coefficient of such a core glass is about $15 \times 10^{-7}$ per degree C. A pure $SiO_2$ cladding should not be employed with a core containing 23 wt.% $GeO_2$ since the expansion mismatch between the core and cladding would render it difficult to consolidate the soot preform without it breaking. Thus, a borosilicate cladding having a roughly matching thermal expansion coefficient is selected. It can be determined that a cladding glass of 12 wt.% $B_2O_3$ and 88 wt.% $SiO_2$ has an expansion coefficient (25°–700° C.) of about $12 \times 10^{-7}$ per degree C., the $3 \times 10^{-7}$ per degree C. difference in expansion coefficients being acceptable. For this combination of core and cladding glasses the softening point temperatures for the core and cladding are about 1630° C. and 1410° C., respectively. This mismatch of 220° C. in the softening point temperatures of the core and cladding glasses creates problems in the filament drawing process. Since the core glass has a much higher softening point temperature than the cladding glass, the hole in the draw blank is difficult to close during the filament drawing process, and the core diameter to outside diameter ratio tends to vary in the resultant filament. To prevent this problem the core should have a softening point temperature that is close to or somewhat lower than that of the cladding. A well known technique for lowering the softening point temperature of the core involves the addition of $B_2O_3$ to the core glass. Addition of $B_2O_3$ however, slightly decreases the refractive index of the core glass and increases the thermal expansion coefficient. To match this increased thermal expansion coefficient of the core glass, more $B_2O_3$ must be added to the cladding glass, thereby bringing back the viscosity mismatch problem. Thus, the amount of $GeO_2$ in the core has had to be limited to a value that would permit consolidation of the soot preform without excessive breakage, and therefore, the higher desired value of NA could not routinely be achieved.

SUMMARY OF THE INVENTION

It is an object of this invention to provide an economical method of forming an optical waveguide filament, which method also overcomes the heretofore noted disadvantages.

Another object of this invention is to provide a method of making an optical waveguide having a high numerical aperture.

A further object is to provide a method of making optical waveguides which is simpler and less costly than prior methods.

These and additional objects, features and advantages of the present invention will become apparent to those skilled in the art from the following detailed description and the attached drawings on which, by way of example, only the preferred embodiments of this invention are illustrated.

This invention relates to an improved method of forming glass filaments by the flame hydrolysis process. Briefly, this method comprises applying a first coating of glass soot to a surface of a substrate to form a soot preform. The preform is heated to a temperature that is sufficiently high to cause an end thereof to be consolidated while it is simultaneously drawn into a filament.

The method of this invention can be employed to form optical waveguides having relatively high numerical apertures. A second coating of glass soot is applied over the outside peripheral surface of the first soot coating, the refractive index of the soot of the second coating being less than that of the first coating. As this composite preform is consolidated and drawn, an optical waveguide filament having a solid cross-section is formed.

DETAILED DESCRIPTION OF THE INVENTION

It is to be noted that the drawings are illustrative and symbolic of the invention, and there is no intention to indicate scale or relative proportions of the elements shown therein. Further, it is to be noted that the present invention expressly contemplates both single mode and multimode waveguides regardless of any specific description, drawing, or example set out herein. The present invention also contemplates optical waveguides having cores with either a constant or gradient index of refraction. In the case of gradient index optical waveguides the cladding may be the outer portion of the core, or it may be a layer whose refractive index is lower than that of the adjacent core material by such an amount that there is an abrupt change in refractive index at the core-cladding interface.

Figure 1:
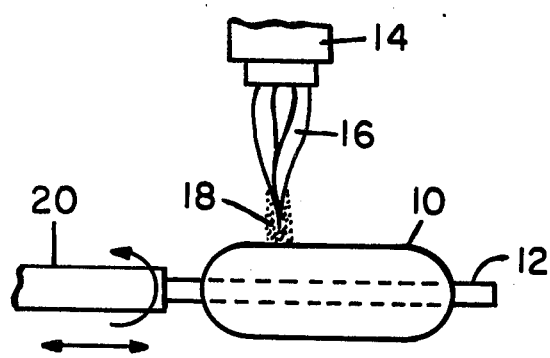
FIGS. 1 and 2 illustrate the application of first and second coatings of glass soot to a mandrel.
Figure 2:
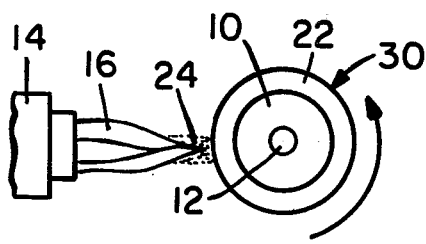

Optical waveguide soot preforms are conventionally prepared in accordance with the methods illustrated in FIGS. 1 and 2. A coating 10 of glass soot is applied to cylindrical mandrel 12 by means of flame hydrolysis burner 14. Fuel gas and oxygen or air are supplied to burner 14 from a source (not shown). This mixture is burned to produce a flame 16 which is emitted from the burner. A gas-vapor mixture is oxidized within flame 16 to form a glass soot that leaves the flame in a stream 18, which is directed toward mandrel 12. The flame hydrolysis method of forming soot coatings on cylindrical mandrels is described in greater detail in the aforementioned U.S. Pat. Nos. Re. 28,029 and 3,823,995. Mandrel 12 is supported by means of handle 20 and is rotated and translated as indicated by arrows adjacent thereto in FIG. 1 for uniform deposition of soot. This method can be employed to produce either step index or gradient index waveguides.

A second coating of soot is applied over the outside peripheral surface of first coating 10 as shown in FIG. 2. In accordance with well-known practice the refractive index of coating 22 is made lower than that of coating 10 by changing the composition of the soot 24 being produced in flame 16. This can be accomplished by changing the concentration or type of dopant material being introduced into the flame, or by omitting the dopant material. Mandrel 12 is again rotated and translated to provide a uniform deposition of coating 22, the composite structure including first coating 10 and second coating 22 constituting an optical waveguide soot preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

Many suitable materials have been used as a dopant alone or in combination with each other to increase the refractive index of fused silica. These include, but are not limited to, titanium oxide, tantalum oxide, aluminum oxide, lanthanum oxide, phosphorus oxide and germanium oxide. A core of germania doped fused silica is advantageously provided with a cladding layer of fused silica doped with boron oxide which provides a refractive index slightly lower than that of pure fused silica and also gives the cladding layer a somewhat higher thermal coefficient of expansion than pure fused silica, thereby providing a better match between the coefficients of expansion of the core and cladding materials.

Heretofore, the mandrel has usually been removed before the consolidation process. The soot preform was thereafter drilled, provided with a wire handle and inserted into a furnace wherein the soot is subjected to a temperature within the consolidation temperature range thereof for a time sufficient to cause the particles of soot to fuse and consolidate to form a dense glass body free from particle boundaries. The resultant hollow glass draw blank was then subjected to a number of further process steps described hereinabove prior to drawing the same to form an optical waveguide filament.

Because of the dopants added to the core region of the blank to increase the refractive index thereof, the coefficient of expansion of that region is greater than that of the cladding region. Thus, when the blank cools after the consolidation process, the central region is put into a state of tension. The aperture in the center of the blank, which has remained after removal of the mandrel, presents a free surface in the region of high tensile force where breaks are readily initiated. The need to keep the coefficient of expansion of the core region down to a value nearer to that of the cladding region is one of the factors that has prevented the production of optical waveguides having higher values of numerical aperture.

Figure 3:
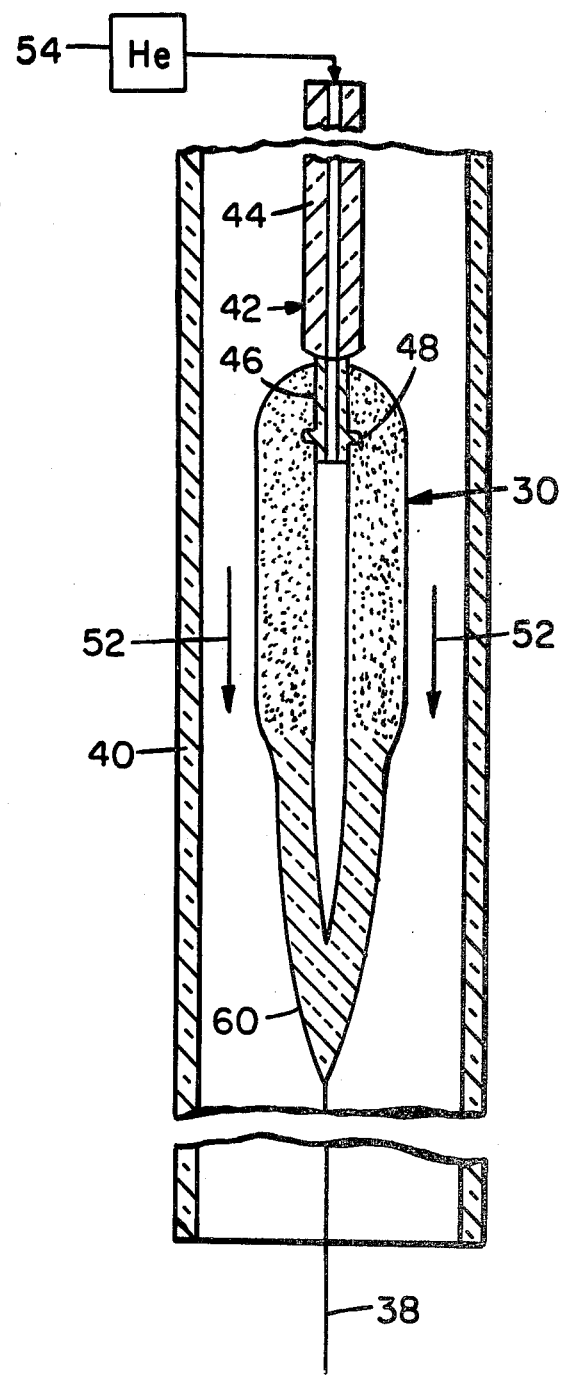
FIG. 3 is a cross-sectional view of a portion of a draw furnace in which a filament is being drawn from a soot preform.

In accordance with the method of the present invention the separate consolidation process is eliminated, and the overall process of forming a filament from a soot preform is greatly simplified. The mandrel is preferably removed from the soot preform 30 and one end thereof is attached to a handle. The soot preform is then inserted into the top of a draw furnace, and a filament 38 is drawn therefrom as illustrated in FIG. 3. For the sake of simplicity, only the draw furnace muffle 40 is shown, the furnace being described in greater detail in my copending application Ser. No. 857,418, entitled "Apparatus for Minimizing Drawn Filament Variation", filed on Dec. 5, 1977.

Handle 42 may consist of a low expansion glass tube 44 to which a short length of smaller diameter tubing 46 is attached. Quartz is a particularly suitable material for tubing 46 since it can withstand the 1600–1850° C. draw temperature without excessive distortion, and since it does not add impurities to the blank. In one specific embodiment tube 44 was a ½ inch outside diameter tube of high silica content glass and tube 46 consisted of a 2 inch long section of ¼ inch diameter quartz tubing having two 0.5 mm bumps 48 of quartz flameworked onto opposite sides of the end thereof that is inserted into the soot preform. After the tube is inserted, it is rotated about 90° to lock it into the preform. Loose soot is then blown from the outside and inside surfaces of the soot preform with dry, filtered nitrogen. The soot preforms employed in this embodiment had an outside diameter of 32 mm in order to provide sufficient clearance between the preform and the muffle which had an inside diameter of about 44 mm.

Handle 44 is placed in a chuck above the draw furnace, and the preform is fed down into the furnace muffle 40 to a position just above the hottest zone. The top of the muffle is sealed in the manner taught in my aforementioned copending application. Muffle gas introduced at the top of the muffle flows down over preform 30 as indicated by arrows 52, as well as through the interstices of the preform to flush gases therefrom during consolidation of the soot. The muffle gas is exhausted at the bottom of the muffle. The muffle gas is one that will allow the soot to consolidate in a bubble-free manner and which will not interact with the glass soot constituents in a way that will harm the optical properties of the resultant filament. Depending upon the particular dopants employed, an oxidizing or reducing condition may be desirable. The preferred muffle gas is one that is rich in helium which can readily pass through the interstices of the porous soot preform to purge residual gas therefrom. The phrase "helium-rich atmosphere" as used herein means one that contains at least 95% helium. Other gases such as oxygen, nitrogen, argon, neon and mixtures thereof may be employed to flush gases from the preform during consolidation. A halogen, preferably chlorine, is sometimes employed to dry the preform to an extent greater than that which can be achieved by the use of helium alone, combinations of helium and chlorine compounds being disclosed in U.S. Pat. No. 3,933,454 for soot consolidation purposes. During this initial period of flushing gas from the preform and muffle, the feed mechanism is stopped so that the preform does not advance into the hottest zone. During this time, flushing gas may also flow from source 54 through the handle and into the center of the preform to provide additional flushing thereof. Adequate flushing may be provided by flowing pure helium into the top of the muffle at a rate of 27 CFH for 15 minutes while flowing helium into the center of the preform at a rate of 3 CFH. Optimal flow rates of these flushing gases depend upon such factors as blank feed rate, consolidation temperature, specific flushing gas composition and the like.

The preform is then advanced into the hot zone of the furnace whereby the soot begins to consolidate as indicated at region 60. The temperature in the hot zone is preferably such that the viscosity of the core glass is between $10^8$ and $10^3$ poise. The desired viscosity depends upon the filament draw rate. Draw rates between 0.75 and 100 feet per minute have been employed, but the present method is not limited to this range. If helium source 54 is employed, it is turned off as soon as the tip of the preform begins to consolidate. The tip of the consolidated glass preform is contacted by the end of a low expansion glass rod to initiate drawing of the filament. The preform is continuously fed into the hot zone of the furnace where it continuously consolidates in a helium rich atmosphere and is drawn into a filament. Since materials evolved from the aperture-forming surface must be permitted to escape, the end of tube 44 remote from the preform should be opened after source 54 is turned off so evolved materials can vent to the atmosphere. Flushing gas represented by arrows 52 continues to flow until the entire preform is consolidated.

EXAMPLES

A plurality of soot preforms were prepared by the above-described flame hydrolysis process. The core portions of the preforms comprised $GeO_2$ doped $SiO_2$, the $GeO_2$ concentration decreasing with radius to cause the refractive index to decrease radially. The cladding portions of the preforms comprised $B_2O_3$ doped $SiO_2$. The preforms were drawn directly into optical waveguide filaments in accordance with the hereinabove described method. The hot zone of the muffle was between 1700° C. and 1835° C. After the muffle was purged of residual gas and the drawing operation initiated, helium was flowed through the muffle at a rate of 27 CFH. During the process of drawing filaments from the preforms, filament diameter was monitored on-line with a Model SSE-5R Mil Master electronic micrometer which is capable of detecting changes of less than 0.25 $\mu$m. This monitor was part of an automatic diameter control system. The nominal filament diameter was set at 110 $\mu$m. The variation in diameter from this value was about ±1 $\mu$m. The results obtained from drawing filament from these preforms are summarized in Table 1.

TABLE 1

| Preform No. | Filament Length (m) | Attenuation at 820 nm (dB/km) | NA (90%) |
|---|---|---|---|
| 1 | 210 | 11.7 | 0.170 |
| 2 | 127 | 13.5 | 0.160 |
| 3 | 255 | 14.4 | 0.177 |
| 4 | 742 | 5.7 | 0.170 |
| 5 | 225 | 19.0 | 0.194 |
| 6 | 414 | 10.0 | 0.184 |
| 7 | 198 | 8.1 | 0.184 |
| 8 | 198 | 9.6 | 0.187 |
| 9 | 173 | 12.0 | 0.194 |

The longest length of filament obtained from each preform is shown in Table 1 along with the attenuation and numerical aperture. It appeared that the presence of seeds near the center aperture of the consolidated preform caused diameter upsets which limited the length of continuous useful filament that could be drawn.

The attenuation due to water at 950 nm was determined to be 30 dB/km for the filament drawn from preform No. 4. This attenuation is lower than that of standard optical waveguide filaments produced by the flame hydrolysis process and is indicative of a relatively low water content. This lower attenuation due to water appears to be the result of a slower soot consolidation feed speed and the effect of the higher consolidation temperature, which is about 400° C. higher than normal consolidation schedules. Conventional consolidation temperatures are limited by sagging of the preform. In accordance with the present invention the higher consolidation temperature enhances the process of outgassing as well as permitting simultaneous drawing of the filament.

Although the present invention has been described with reference to specific embodiments thereof, additional embodiments within the scope of the present invention should be readily apparent to those skilled in the art. Whereas mandrel 12 is preferably removed prior to consolidation, it could remain in the soot preform and be drawn therewith to form the central portion of the resultant filament. It is to be noted, however, that such a mandrel must be made from optical quality glass. In this embodiment handle 20 is utilized as a support for the preform during the soot consolidation-drawing operation. In yet another embodiment the soot can be deposited on the inner surface of a glass tube in accordance with the teachings of the aforementioned U.S. Pat. No. 3,711,262. Handle 42 can be inserted into such a preform, and consolidation thereof can proceed as described in conjunction with the preferred embodiments.

I claim:

1. A method of forming a high purity glass filament comprising the steps of
   providing a substantially cylindrical mandrel,
   applying a first coating of glass soot to the outside peripheral surface of said mandrel,
   removing said mandrel to form a soot preform having an aperture therein,
   heating said preform to a sufficiently high temperature for a sufficient period of time to permit the soot at at least one end thereof to consolidate, and simultaneously
   drawing the consolidated portion of said preform to reduce the cross-sectional area thereof and close said aperture, thereby forming an optical waveguide filament.

2. A method in accordance with claim 1 wherein the step of applying a first coating of glass soot comprises applying a plurality of distinct and successive layers of glass soot, each distinct layer having a substantially uniform composition therethrough but having a progressively different composition from the preceding layer so as to form a structure having a stepped, radially varying composition.

3. A method in accordance with claim 1 wherein, prior to the step of removing said mandrel, said method comprises applying a second coating of glass soot over the outside peripheral surface of said first coating, the glass soot of said second coating having a refractive index less than that of the glass soot of said first coating.

4. A method in accordance with claim 1 wherein, prior to the time that said aperture closes, helium is bled into said aperture.

5. A method in accordance with claim 1 wherein, during the step of heating said preform, said preform is subjected to a helium-rich atmosphere.

6. A method in accordance with claim 5 wherein the step of heating said preform to a sufficient temperature comprises heating said preform to a temperature at which the viscosity of said core glass is between $10^8$ and $10^3$ poise.

7. A method in accordance with claim 6 wherein, prior to the step of drawing, helium is bled into said aperture to purge residual gases from the interstices of said soot preform.

8. A method of forming a glass optical waveguide comprising the steps of
   providing a substantially cylindrical mandrel,
   applying a first coating of glass soot to the outside peripheral surface of said mandrel,
   applying a second coating of glass soot over the outside peripheral surface of said first coating, the glass soot of said second coating having a refractive index less than that of the glass soot of the first coating,
   removing said mandrel to form a soot preform having an aperture therein,
   affixing a handle to one end of said preform,
   supporting said preform by said handle in a draw furnace, heating said preform to a sufficiently high temperature for a sufficient period of time to permit the soot at one end thereof to consolidate, and simultaneously drawing the consolidated portion of said preform to reduce the cross-sectional area thereof and close said aperture, thereby forming an optical waveguide filament.

9. A method in accordance with claim 8 wherein, during the step of drawing, said preform is disposed in a helium-rich atmosphere.

10. A method in accordance with claim 9 wherein the step of affixing a handle comprises inserting into an end of said aperture a hollow tube having at least one protrusion thereon, and twisting said tube to cause said protrusion to engage the aperture-forming wall of said preform.

11. A method in accordance with claim 10 wherein loose soot is blown from said preform by an inert gas after said tube is inserted therein.

12. A method in accordance with claim 11 wherein, prior to the time that said drawing step is initiated, helium is bled through said tube into said aperture, the flow of helium into said aperture being terminated prior to the time that said drawing step is intiated.

13. A method of forming a high purity glass filament comprising the steps of
providing a substrate,
applying a first coating of glass soot to a surface of said substrate,
heating the resultant combination to a sufficiently high temperature for a sufficient period of time to permit the soot at at least one end thereof to consolidate, and simultaneously
drawing the consolidated portion of said combination to reduce the cross-sectional area thereof, thereby forming an optical waveguide filament.

14. A method in accordance with claim 13 wherein said substrate is a glass rod.

15. A method in accordance with claim 13 wherein said substrate is a glass tube.

* * * * *